Aug. 19, 1958 W. S. BOALS 2,847,908
AUTOMATIC CHARGER FOR GUNS AND CONTROL THEREFOR
Filed July 31, 1950 3 Sheets-Sheet 2

INVENTOR.
WAYNE S. BOALS
BY
Fulwider & Mattingly
ATTORNEYS.

Aug. 19, 1958 W. S. BOALS 2,847,908
AUTOMATIC CHARGER FOR GUNS AND CONTROL THEREFOR
Filed July 31, 1950 3 Sheets-Sheet 3

WAYNE S. BOALS
INVENTOR.

BY
Fulwider & Mattingly
ATTORNEYS.

United States Patent Office 2,847,908
Patented Aug. 19, 1958

2,847,908

AUTOMATIC CHARGER FOR GUNS AND CONTROL THEREFOR

Wayne S. Boals, Los Angeles, Calif., assignor to Hughes Tool Company, Houston, Tex., a corporation of Delaware Application July 31, 1950, Serial No. 176,877

22 Claims. (Cl. 89—1)

My invention relates generally to armament such as machine guns, and more particularly to devices and equipment for mechanically charging such guns so that the gunner need not perform this operation manually.

In the operation of a machine gun such as may be mounted upon an aircraft, it is necessary to charge the gun occasionally, this operation requiring the movement of the breech block, and in the case of the larger guns, requiring a considerable physical effort on the part of the gunner if this is done manually. However, in many instances a gun is located in an inaccessible position, such as in the wing of an aircraft, where the charging must be done mechanically. Preferably, the charging means is also operated automatically whenever the gun fails to fire, thereby relieving the operator of all mental and physical effort.

Reliability of operation, of course, is of extreme importance, and hence any automatic charger must be of simple and rugged construction that will withstand continued operation over an extended period of time. Electric operation is possible, but electrically operated linear actuators usually do not have the speed necessary for the rapid recharging of a gun. Hydraulic actuators having the necessary speed of operation are available, but because of the extreme range of temperature to which such devices are subjected, the hydraulic fluid actuating such operators is subject to changes in viscosity, if not actual freezing. Consequently, pneumatically operated chargers have been found to be the most satisfactory under the severe conditions encountered in military and comparable usage.

It is therefore a major object of my invention to provide an improved charging mechanism for guns and to further provide a device for independently operating the ejector and reloader mechanism of an automatic gun.

Another object of my invention is to provide such a charger of simple and rugged construction, having the utmost in reliability of operation.

It is a further object of my invention to provide such a device that operates automatically to charge the gun whenever the firing control is energized and the gun does not fire.

Still another object of my invention is to provide a charging mechanism that, while operating automatically, may also be operated by a gunner adjacent the gun, or may be operated by someone from a remote position, the mechanism also being operable to hold the breech block in its rearward position if so desired.

It is a still further object of my invention to provide an improved charger for a gun that is operated by pneumatic means, thereby securing the utmost in reliability and speed under all conditions of use.

These and other objects and advantages of my invention will become apparent from the following description of preferred and optional forms thereof, and from the drawings illustrating those forms, in which:

DESCRIPTION OF FIGURES 1–8

Referring now to the drawings, and particularly to Figures 1 to 5 thereof, the numeral 20 indicates generally a gun of the type usually referred to as a machine gun, the particular type here indicated being of a size and type intended for use with 20 mm. ammunition. The details of construction and operation of such a gun are well known, and form no part of my present invention except as the gun is combined and cooperates with a charger 21 that is mounted thereon and is the subject of my invention.

It will be realized that in the operation of such a gun, it is necessary to eject the empty shell case and insert a loaded shell each time the gun is fired. As each round of ammunition is fired, the recoil of the gun operates the case-ejecting mechanism and feeds an unfired shell into the firing chamber. However, when the gun is first loaded, some means must be provided to insert the first shell into the firing chamber, and likewise should a shell fail to fire, it must be removed from the firing chamber and another shell substituted therefor. In each of these cases, the insertion of the unfired shell within the firing chamber is known as charging the gun, and this is normally accomplished by moving the breech block rearwardly, away from the muzzle, and then returning it to its original position.

Depending upon the size of the gun and its location, this operation is often accomplished manually, though mechanical devices for performing this function are available. However, most such mechanical operators have heretofore been hydraulically operated, and have consequently been open to the objections previously mentioned.

It will be appreciated that existing guns, whether intended for manual or mechanical charging, have a member connected to the breech block slide for moving the latter rearwardly, this member projecting exteriorly of the gun housing for manual operation by the gunner, or for engagement by an appropriate member of the mechanical charging means. Since the member connected to the breech block slide normally projects through one side of the housing of the gun 20, I have designed my improved charging mechanism 21 for mounting upon the side of the gun, as indicated generally in Figure 1. In its broader aspects, the charger 21 consists of a control valve assembly 22 controlling the operation of a piston within a cylinder 23 extending parallel to the axis of the gun. For simplicity in servicing, I prefer to hold the charger 21 to the gun housing 20 by readily disengageable means, such as a support 24 attached to the gun 20 and having an aperture therein to receive a pin 25 on the end of the cylinder 23. Near the other end of the cylinder, I provide a mounting bracket 26 that is firmly connected to the gun 20 and provided with a holding cam 27 that is manually operable to release a cooperating section 28 attached to the cylinder 23. In this manner, the entire charger assembly 21 may be quickly and easily removed from the gun 24 for repairs or servicing of either.

Figure 1:
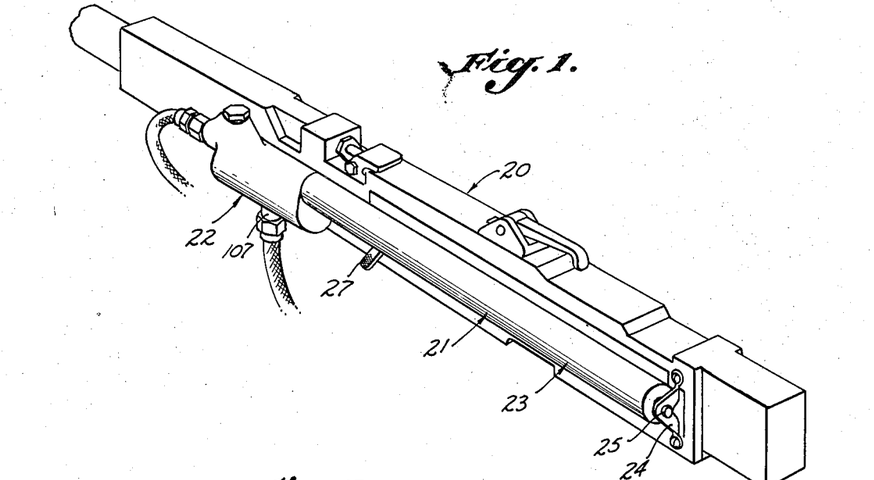
Figure 1 is a perspective view of my improved charger as it may be applied to a machine gun.
Figure 2:
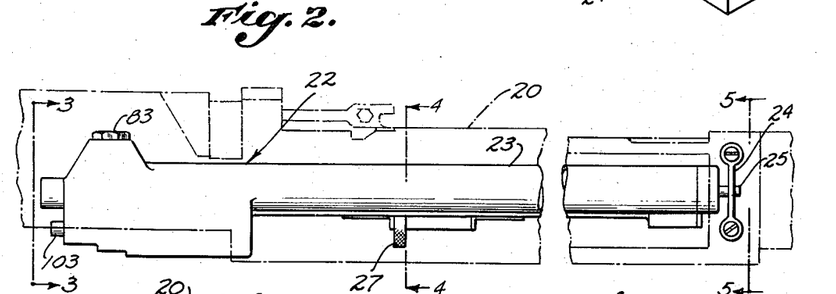
Figure 2 is a side elevational view taken in the direction of the arrow 2 in Figure 1, showing the mounting of my improved charger upon the gun.
Figure 3:
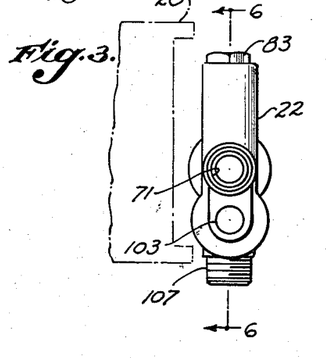
Figure 3 is an end elevational view of the muzzle end of the charger, taken on the line 3—3 of Figure 2.
Figure 4:
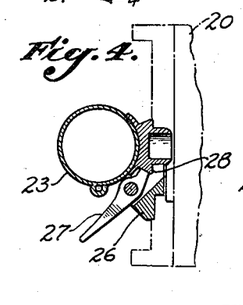
Figure 4 is a cross-sectional view through the charger, taken on the line 4—4 of Figure 2.
Figure 5:
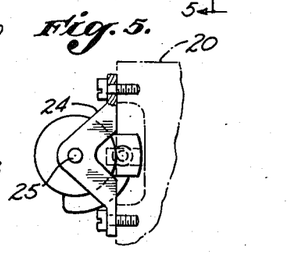
Figure 5 is an end elevational view of the breech end of the charger, showing the method of supporting the latter on the gun, taken on the line 5—5 of Figure 2.
Figure 6:
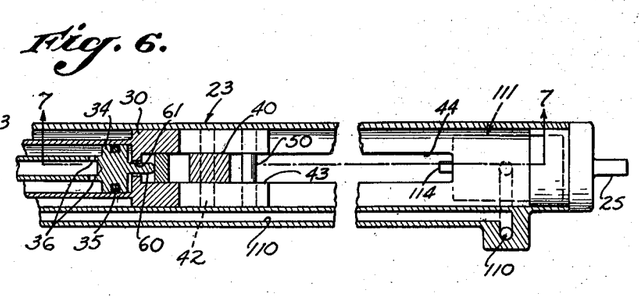
Figure 6 is an axial sectional view of the charger, taken along the line 6—6 of Figure 3.

Turning now to the construction of the charger 21, Figure 6 is a longitudinal axial view of the charger showing the construction thereof. As previously mentioned, the valve assembly 22 controls the operation of a piston 30 within the cylinder 23. The piston 30 is a double acting piston of generally tubular construction, normally urged forwardly to the position indicated in Figure 6, but slidable rearwardly, toward the breech end of the gun, when charging is necessary.

To secure this reciprocating movement of the piston 30, the latter is formed as a generally cylindrical member having a piston head 31 at the forward end of a tubular portion 32. Within the tubular portion 32 is a coaxial pressure tube 33 formed as a rigid extension of the valve assembly 22, the outer diameter of the pressure tube being materially smaller than the internal diameter of the tubular portion so that an annular space is formed therebetween. At its rear end, the pressure tube 33 is provided with a head 34 that fits snugly within the tubular portion 32, and a sealing member such as an O-ring 35 is mounted in the head to prevent the escape of pressure between the head and the tubular portion. Apertures 36 extend through the wall of the pressure tube 33 adjacent the head 34 so that pressure within the pressure tube is communicated to the annular space between that tube and the tubular portion 32.

At the forward end of the tubular portion 32, the piston head 31 extends radially inwardly to bear against the pressure tube 33, and also extends outwardly to bear against the interior of the cylinder 23, thereby forming an operating pressure chamber 39. Sealing members such as O-rings 37 and 38 bear against the pressure tube 33 and the interior of the cylinder 23, respectively, to prevent the escape of fluid past the head 31.

The internal diameter of the tubular portion 32 is materially less than the internal diameter of the cylinder 23, and consequently the area of the head 31 between the pressure tube 33 and the cylinder 23, which may be termed the forward face, is materially greater than the area between the pressure tube and the tubular portion 32, which may be termed the rearward face. Therefore, if fluid under pressure is introduced into the operating pressure chamber 39, and if fluid under the same pressure is simultaneously introduced into the space between the pressure tube 33 and the interior of the tubular member 32, the force exerted upon the forward face of the piston head 31, urging it rearwardly, will be greater than the force exerted upon the rearward face of that same head urging it forwardly. Under these conditions, the piston 30 will be moved rearwardly, and upon the release of pressure from the operating pressure chamber 39, and the maintenance of the pressure within the tubular portion 32, the piston will be returned to its forward position, shown in Figure 6. Thus, by maintaining pressure within the tubular portion 32 at all times, the piston is subjected to a force urging it forwardly at all times. However, by applying the same pressure to the operating pressure chamber 39, the greater area of the forward face of the piston head 31 will move the piston to its rearward limit and hold it there so long as that pressure is maintained. Consequently, it is only necessary to control the pressure applied to the forward face of the piston in order to control the movement thereof, the piston being positively driven in either direction. Thus cylinder 23, in combination with pressure tube 33 and head 34, forms a double cylinder for the double action of piston head 31.

On the rearward end of the piston 30 I mount a pivoted drive lug 40 adapted to engage a breech block slide 41, the latter forming a part of the gun 20. It is to be realized that the breech block slide 41 is moved rearwardly by the force of the explosion each time the gun is fired, and consequently the slide must be free to move independently of piston 30 during normal operation of the gun. However, when the gun is being charged, the driving lug 40 must be adapted to engage the breech block slide 41 and move it rearwardly, and then return with the slide to their original positions, thereafter leaving the slide free to move as the gun is fired, until charging is again necessary.

Figures 7, 8:
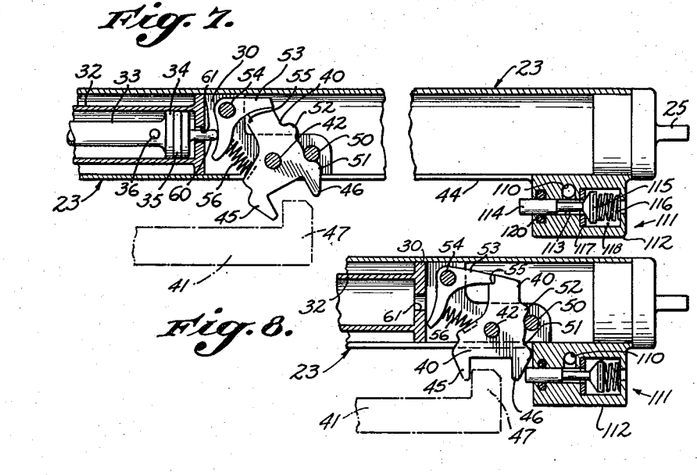
Figure 7 is an axial sectional view of the breech end of the charger, taken on the line 7—7 of Figure 6, and showing the driving lug in its normal position.
Figure 8 is a view similar to Figure 7 but showing the operating piston and the driving lug in their charging positions at the breech end of the charger.

To provide this selective engagement of the drive lug 40 with the breech block slide 41, I mount the lug on the piston 30 for pivotal movement with respect thereto. As indicated in Figure 7, the drive lug 40 is provided with a shaft 42 that is supported by the piston 30, the latter being provided with an axially extending slot 43 in which the drive lug is received. A cooperating slot 44 is formed in the side of the cylinder 23 and one end of the drive lug 40 extends through this cooperating slot to engage the breech block slide 41. The projecting end of the drive lug 40 is notched to provide a pair of arms 45 and 46, it being noted that the breech block slide 41 is formed with a cooperating extension or lug 47 adapted to fit within the notch of the drive lug and be engaged by either of the arms 45 or 46.

As best seen in Figures 7 and 8, the rotation of the drive lug 40 about the shaft 42 is limited by a drive lug stop 50 that extends through the slot 43 and is positioned to engage either of two ears 51 or 52 formed on the drive lug. When the drive lug 40 is in its normal position, the breech block slide 41 is free to move rearwardly without engaging the drive lug. Under these conditions, the drive lug 40 is rotated to the position indicated in Figure 7, where it is seen that the rearmost arm 46 of the drive lug is removed from the path of the breech block slide lug 47, the ear 51 of the drive lug bearing against the drive lug stop 50. As hereinafter described, while the gun 20 is being charged, the drive lug 40 is rotated, in a clockwise direction as seen in Figure 8, so that the forward and rearward arms 45 and 46, respectively, are both in position to engage the lug 47 of the breech block slide 41, the ear 52 of the drive lug bearing against the drive lug stop 50 during these conditions.

To hold the drive lug 40 in its slide-engaging position, I provide a latch member 53 that is pivotally mounted upon the piston 30 by a shaft 54. The latch 53 is generally L-shaped, having one arm adapted to enter a notch 55 in one end of the drive lug 40, while the other arm of the latch extends in a direction generally across the piston 30, the entire latch fitting within the slot 43. A compression spring 56 bears against the last-mentioned arm of the latch 53 and against the drive lug, urging the lug toward its disengaged position, shown in Figure 7, and urging the latch toward its lug-engaging position, shown in Figure 8. Consequently, whenever the lug 40 is free to rotate with respect to the piston 30, the lug assumes the disengaged position, but may be moved to engaging position, against the urging of the spring 56. This engaging operation occurs when the piston 30 is moved rearwardly to charge the gun 20.

It will be noted that the arm 45 of the drive lug 40 extends from piston 30 through slot 44 of the cylinder 23 a distance sufficient to engage the cooperating lug 47 on the breech block slide 41. Consequently, when the piston 30 is moved rearwardly, carrying with it the drive lug 40, the arm 45 bears against the slide lug 47, thereby pivoting the drive lug 40 as the piston moves rearwardly until such time as the ear 52 of the drive lug encounters the stop 50. This clockwise rotation of the drive lug rotates the end thereof containing the notch 55, the latter being moved to a point where the latch 53, under the urging of the compression spring 56, can snap into the notch and hold the drive lug against counter-clockwise rotation. Thereafter, the drive lug 40 is held in the position indicated in Figure 8, where the arm 45 engages the slide lug 47 for moving the latter rearwardly, while the arm 46 of the drive lug can engage the slide lug 47 to move the latter forwardly.

The release of the drive lug 40 from the latch 53 is effected by a projection or stud 60, formed on the end of the head 34 of the pressure tube 33, and adapted to extend through a hole 61 formed in the piston 30. Since the head 34 and the stud 60 are immovable with respect to the cylinder 23, the stud 60 projects through the hole 61 only when the piston 30 is in its forward or normal position. The arm of the latch 53 against which the spring 56 bears is aligned with the hole 61 so that the stud 60 bears against that arm, urging it toward the drive lug 40, and thus compressing the spring when the piston 30 is in its forward position. As the piston 30 moves rearwardly, the stud 60 is withdrawn from the hole 61, and the latch 53 is then freed to engage the notch 55 when the drive lug 40 is pivoted, as heretofore described. When the piston 30 is moved forwardly, the stud 60 again enters the hole 61 as the forward stroke of the piston is completed, the stud bearing against the arm of the latch 53 and pivoting it in a counter-clockwise direction, as seen in Figures 7 and 8, thereby removing the other arm of the latch from the notch 55 and permitting the drive lug 40 to be returned to its original position, as shown in Figure 7.

To control the admission of fluid into the operating pressure chamber 39, I have provided a control valve assembly 22 shown in Figure 6. In this form of the assembly, a housing or block 70 is provided that may be formed as apart of the cylinder 23, or rigidly connected thereto. At the forward end of the block 70, I provide a coupling 71 adapted to be connected to a supply of fluid under pressure, such as compressed air (not shown). From the coupling 71, a passageway 72 leads generally upwardly to a pressure chamber 73 that in turn is connected by a passageway 74 to the interior of the pressure tube 33, previously described. In this manner, fluid under pressure is continuously supplied to the pressure tube 33 so long as the coupling 71 has fluid under pressure supplied to it. Another passageway 75 leads from the space between the piston head 31 and the end wall of the cylinder 23, to a point below the pressure chamber 73, the passageway terminating in a bore 76 extending vertically from the chamber 73 to an exhaust chamber 77, the latter being vented to the exterior of the block 70 by a passageway 78.

At its upper end, the bore 76 is surrounded by a valve seat 80, here shown as an upwardly extending boss, against which a valve head 81 is normally urged by a compression spring 82. The upper end of the spring 82 may conveniently bear against a threaded plug 83, the latter permitting adjustment of the force exerted by the spring against the valve head 81. It will be noted that the diameter of the bore 76 is somewhat smaller than that of the chamber 73, and the valve head 81, located within the chamber, is provided with axially extending grooves on its periphery that insures the passage of fluid under pressure from the pressure chamber to the bore when the valve is open. However, as hereinafter described, the valve head 81 normally is urged against the valve seat 80 by the spring 82, thereby closing the valve and preventing the passage of fluid from the pressure chamber 73 to the bore 76.

At its lower end, the bore 76 is provided with another valve seat 84, here shown as a downwardly projecting boss, similar to the valve seat 80 at the upper end of the bore. A piston 85 is slidably mounted within the exhaust chamber 77, and carries a sealing member 86 adapted to cooperate with the valve seat 84 to form therewith a normally open valve that may be closed by moving the piston upwardly.

Slidably mounted within the bore 76 is a plunger 87 extending between the lower surface of the valve head 81 and the upper surface of the piston 85. Fins or other aligning means are provided on the plunger 87 to maintain the plunger axially aligned with the bore 76 at all times while insuring the free flow of fluid from the passageway 75 to either of the valves at the upper and lower ends, respectively, of the bore. In this way the valve head 81 and the piston 85 move simultaneously, so that the normal urging of the spring 82 forces the valve head downwardly to bear against the valve seat 80, and the piston 85 is simultaneously moved downwardly away from the valve seat 84. Similarly, the movement of the piston 85 upwardly to a position where the sealing member 86 bears against the valve seat 84 causes the upward movement of the valve head 81 away from the valve seat 80 to close the lower valve and open the upper valve.

Beneath the piston 85 is a piston chamber 90 that is normally vented to the atmosphere, but may, under the proper conditions, be subjected to pressure that acts to move the piston upwardly. The normal venting to the atmosphere is provided by a passageway 91 that leads from the piston chamber 90 to a valve chamber 92, the latter being connected through passageways 93 and 94 to the exterior of the block 70. At its point of connection to the valve chamber 92, the passageway 93 is surrounded by a valve seat 95 here shown as a forwardly projecting boss, adapted to cooperate with a double acting valve head 96 that is axially movable within the valve chamber. Normally, the valve head 96 is spaced from the valve seat 95, and a valve stem 97, connected to the valve head, extends axially through the passageway 93 to a solenoid operator, herein designated as a charging solenoid 98.

At the forward end of the valve chamber 92 is a passageway 100, preferably axially aligned with the passageway 93, that is adapted to be closed by the forward end of the double-acting valve head 96. A passageway 101, having a restriction 102 therein, connects the previously-mentioned passageway 100 to the fluid coupling 71, the transmission of fluid under pressure from the coupling normally being prevented by the closure of the passageway 100 by the double-acting valve head 96. A spring or other suitable means (not shown) within the charging solenoid 98 normally urges the valve stem 97, and the double-acting valve head 96 to the forward position shown in Figure 6, thus venting the piston chamber 90 to the atmosphere. However, upon energization of the solenoid 98, the double-acting valve head is moved rearwardly, thus closing the passageway 93 and opening the passageway 100 so that fluid may pass from the coupling 71, through the passageways 101 and 100, the valve chamber 92, and the passageway 91 into the piston chamber 90. To provide for the manual operation of the double-acting valve head 96 without energization of the charging solenoid 98, a plunger 103, extends through the passageway 100 to a point exterior of the valve block 70 and preferably on the forward end of the latter where it may be engaged by a finger and pushed inwardly to close the passageway 93 and open the passageway 100.

In addition to the passageway 91, the piston chamber 90 has a second venting passageway 104 connected to it. This passageway, located between the cylinder portion 23 and the charging solenoid 98, extends rearwardly from the piston chamber 90 to a normally closed valve 105 that is operated by a firing solenoid 106. Preferably, the charging solenoid 98 and the firing solenoid 106 are placed back-to-back with their corresponding valves at opposite ends, and electrical connections to the solenoids are conveniently made through a separable electrical connector 107.

From the normally closed valve 105, a passageway 110 extends rearwardly to the rear end of the cylinder portion 23, terminating in a relief valve 111. The construction and operation of the relief valve 111 is best seen in Figures 7 and 8, where it will be noted that the valve includes a housing 112 attached to the cylinder portion 23, and provided with a bore 113 extending through the body in a direction parallel to the axis of the cylinder portion 23. Mounted within the bore 113 and projecting forwardly from the body 112 is a valve stem 114 having a valve head 115 on its rearward end. A compression spring 116 urges the valve head 115 forwardly to bear against a valve seat 117 surrrounding the bore 113. The valve head 115, the spring 116, and the valve seat 117 are mounted in a chamber 118 that is vented to the atmosphere, and the passageway 110 is connected to the bore 113 so that when the relief valve 111 is open, the passageway 110 is vented to the atmosphere. A sealing member 120 prevents the passage of fluid between the passageway 110 and the exterior of the housing 112, along the plunger or valve stem 114, and the valve 111 is opened by pressing the forward end of the plunger or valve stem rearwardly, against the urging of the spring 116.

To complete the controls for my improved gun charger, I provide a firing relay 125 connected to a suitable source of electrical energy (not shown) and controlled by a manually operable switch 126. The relay 125 has two sets of contacts 127 and 128, the first set controlling the energization of the firing solenoid 106, and the second set controlling the energization of the charging solenoid 98. Additionally, a manually operated switch 130 is provided to energize the charging solenoid 98 without energizing the firing solenoid 106, the contacts 127 of the relay 125 also controlling the energization of a conductor 131 that operates the firing control (not shown) of the gun itself.

*Operation of charger shown in Figures 1–8*

During all phases of the operation of my improved gun charger, it is necessary that a supply of fluid under pressure be connected to the coupling 71, and except as hereinafter noted, a supply of electrical energy must be available for the operation of the charging solenoid 98 and the firing solenoid 106. Assuming that these conditions are met, it will be remembered that the normal position of the various elements is as indicated in Figures 6 and 7, and consequently fluid under pressure, such as compressed air, acts through the passageway 72, the pressure chamber 73, the passageway 74, the pressure tube 33, and the aperture 36 to urge the piston head 31 forwardly. At the same time, the double-acting valve head 96 remains in the position shown in Figure 6, thereby venting the piston chamber 90 through the passageway 91, the valve chamber 92, and the passageways 93 and 94. Consequently, the compression spring 82 urges the valve head 81, in the pressure chamber 73, downwardly against the valve seat 80, simultaneously holding the piston 85 away from the valve seat 84, and thus venting the operating pressure chamber 39 to the atmosphere through the passageway 75, the exhaust chamber 77, and the passageway 78.

If the gun is now to be charged by the gunner, it is only necessary for him to press the plunger 103 rearwardly, thereby moving the double-acting valve head 96 away from the passageway 100, and closing passageway 93. This admits compressed air into the valve chamber 92 from the passageway 100, the air being admitted somewhat slowly because of the restriction 102 in the passageway 101. Passageway 93, which normally vents the valve chamber 92 to the atmosphere, is closed by the double-acting valve 96, and thus the pressure within the valve chamber is increased. This pressure is transmitted to the piston chamber 90 through the passageway 91, eventually reaching a value sufficient to move the piston 85 upwardly, against the urging of the spring 82. Since valve 105, connected to the firing solenoid 106, is closed, the pressure within the piston chamber 90 and the valve chamber 92 is maintained so long as the plunger 103 is pressed rearwardly. The piston 85 is thus held against valve seat 84, and valve head 81 is held away from valve seat 80 by the action of the plunger 87, so that the interior of the bore 76 is no longer vented to the atmosphere through the exhaust chamber 77 and passageway 78, but instead is subjected to the full pressure of the air within the pressure chamber 73. Under these conditions, compressed air is admitted through passageway 75 to the operating pressure chamber 39, moving the piston 30 rearwardly and simultaneously displacing at least a portion of the air within the space between the tubular portion 32 and the pressure tube 33. While the pressure per unit of area is the same on both the forward and rearward faces of the piston head 31, the effective area of the forward face is greater, and consequently the piston is moved rearwardly, as previously discussed.

At the start of its rearward movement, the drive lug 40 is in the position indicated in Figure 7, but as soon as the arm 45 engages the lug 47 of the breech block slide 41, the drive lug is pivoted in a clockwise direction until the ear 52 bears against the stop 50, as seen in Figure 8. At substantially the same time, the latch 53 snaps into the notch 55 to hold the drive lug against counterclockwise rotation, and the piston 30, the drive lug 40, and the breech block slide 41 are moved rearwardly to the position indicated in Figure 8. At the time this rearward limit of travel is reached, the arm 46 of the drive lug 40 bears against the valve stem 114 of the relief valve 111, opening the latter, and venting the passageway 110 to the atmosphere. However, since the valve 105 is closed, as previously mentioned, the venting of the passageway 110 has no effect upon the operation of the charger.

So long as the plunger 103 is pressed rearwardly, the piston 30 will be held in its rearward position, thereby maintaining the breech block slide in its rearward position. However, upon release of the plunger 103, the latter is returned to its forward position by the action of the spring (not shown) within the charging solenoid 98, thereby closing the passageway 100 and opening the passageway 93, venting the valve chamber 92 and the piston chamber 90. With this release of pressure, the spring 82 urges the valve head 81 downwardly against the valve seat 80, forcing the piston 85 downwardly, away from the valve seat 84. Consequently, the operating pressure chamber 39 is again vented through the passageway 75, the bore 76, the exhaust chamber 77 and the passageway 78. The compressed air within the pressure chamber 73 then passes through the passageway 74 and the interior of the pressure tube 33 to urge the piston head 31 forwardly, as previously explained, carrying with it the piston 30, the drive lug 40, and breech block slide 41. Near the end of its forward stroke, the latch member 53 bears against the plunger 60, pivoting the latch member to release the drive lug 40, thereby returning the various parts to their original position. The gun 20 has been charged by this operation, and since the double-acting valve head 96 was moved by manual pressure on the plunger 103, no electrical power has been required for the operation of the charger. Should it be desired to retain the breech block slide 41 in its rear position for a considerable period of time, it may be inconvenient to press the plunger 103 rearwardly for the entire period, and consequently the switch 130 may be closed, thereby energizing the charging solenoid 98 and moving the valve stem 97 and double-acting valve head 96 rearwardly, in the same general manner and for the same purpose as if the operation were performed manually.

When the gun 20 is to be fired, the switch 126 is closed, thereby operating the relay 125 to close the contacts 127 and 128. The actual control of the firing mechanism of the gun is accomplished in any suitable and well known manner, this control not being shown, and not, as such, being a part of my invention except as it may combine with the charger control herein described and shown. Closure of the contacts 127 and 128 energizes the firing solenoid 106 and the charging solenoid 98, respectively, thereby opening the valve 105 and moving the double-acting valve head 96 from its position closing passageway 100, to the position wherein it closes passageway 93. If the gun 20 is charged and ready to fire, the closing of the contact 127 will energize the firing control, and the first round of ammunition will be fired.

As previously mentioned, machine guns are customarily designed so that the recoil of the breech block operates the charging mechanism, and the breech block slide 41, which is connected to the breech block and charging mechanism, is thus moved rearwardly, toward the relief valve 111, each time a round of ammunition is fired. As the slide 41 reaches its rearward limit of travel, the lug 47 mounted on the slide bears against the plunger or valve stem 114 of the relief valve 111, thereby opening the valve and venting the passageway 110 to the atmosphere. Since the valve 105 is held open by the operation of the firing solenoid 106, the venting of the passageway 110 acts to vent the piston chamber 90, and consequently any pressure therein is released. It will be appreciated that one of the reasons for the use of the restriction 102 is to prevent too rapid a pressure increase within the piston chamber 90, so that the piston 85 does not have an opportunity to move during the interval between the firing of successive rounds of ammunition. Consequently, so long as the gun 20 continues to fire in a normal manner while the switch 126 is closed, the pressure within the piston chamber 90 does not reach a value sufficient to move the piston 85 upwardly, the pressure being periodically released by the intermittent operation of the relief valve 111 by the breech block slide 41.

However, should the gun fail to fire, either when the charging switch is first closed, or during the firing of a consecutive number of rounds, the relief valve 111 will not be operated, since the breech block slide 41 is not moved rearwardly. Consequently, pressure within the piston chamber 90 will be gradually increased, and since there is no release of this pressure, it will eventually reach a value sufficient to operate the piston 85. When this occurs, the piston moves upwardly to bear against the valve seat 84, and the valve head 81 is moved upwardly, away from the valve seat 80. Under these conditions, the piston 30 is moved rearwardly, as previously described, moving the breech block slide 41 with it, until the rearward limit of travel is reached. At that time, the arm 46 of the drive lug 40 bears against the plunger or valve stem 114 of the relief valve 111, releasing the pressure within the passageway 110. Since the valve 105 is held open by the action of the firing solenoid 106, the pressure within the piston chamber 90 is likewise released, and the piston 85 returns to its normal position, permitting the valve head 81 to close against the valve seat 80. The piston 30 of the cylinder 23 is then moved forwardly, and the charging operation is completed. Thereafter, the firing of the gun continues until the firing switch 126 is opened or until the gun again needs charging.

Figures 9, 10, 11:
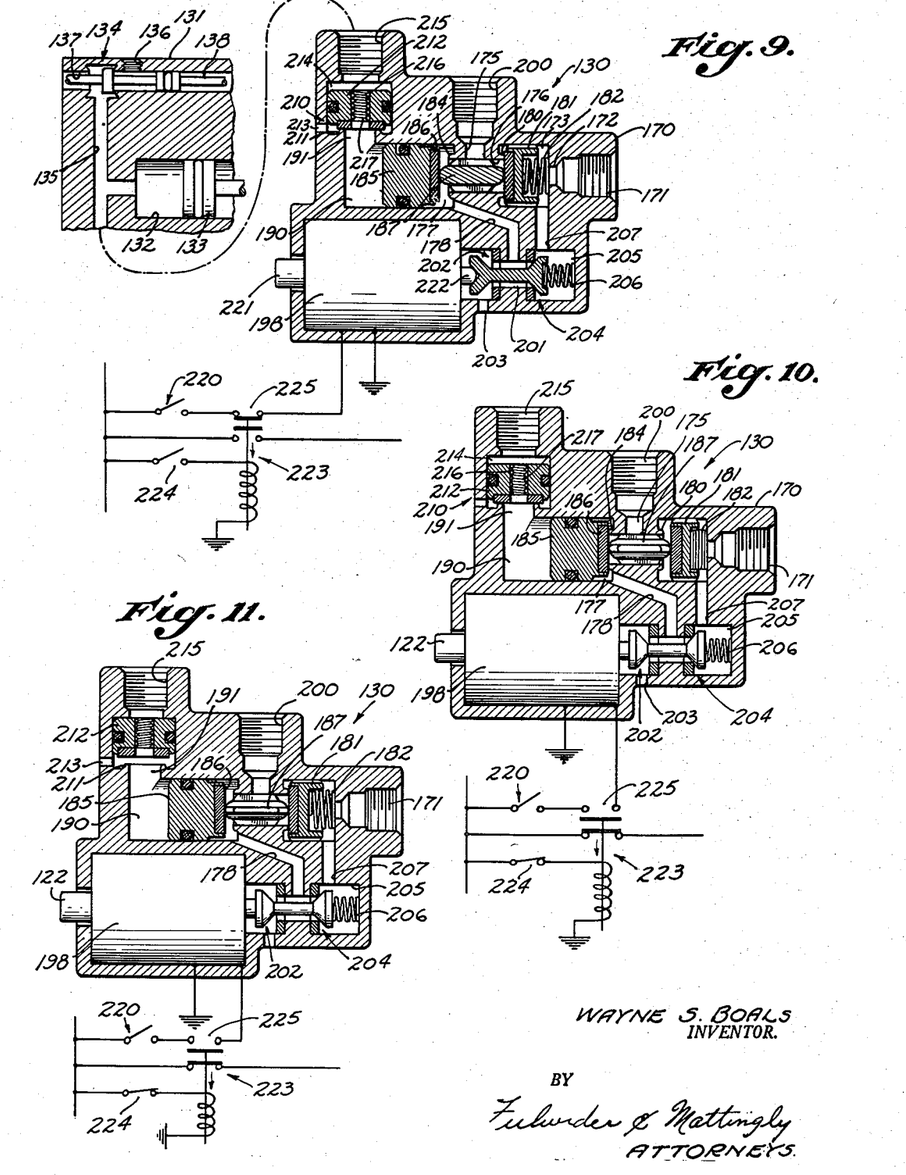
Figure 9 is a cross-sectional view of a control for an optional form of automatic charger used in conjunction with a pneumatically operated ammunition feed, the controls being shown in a normal or de-energized position.
Figure 10 is a cross-sectional view of the charger control shown in Figure 9, but with the various members thereof shown in the position they occupy at the start of the automatic charging operation.
Figure 11 is a view of the charger shown in Figures 9 and 10, with the parts thereof in the position they occupy at the end of the charging operation.

DESCRIPTION OF FIGURES 9–11

While the form of my device heretofore shown and described is very satisfactory where a charger is to be applied to an existing gun 20, it is oftentimes both possible and desirable to incorporate portions of the charger within a gun when the latter is in the process of being designed. One form of the control valve assembly of such a charger is indicated in Figures 9 to 11, wherein I have disclosed a control assembly 130 adapted to be connected to the operating piston of a charger cylinder (not shown) that can be incorporated in the gun, the gun being provided with a pneumatically operated ammunition feed. I have shown a small fragment of the control section of such a pneumatically operated feed in order that its operation may be more clearly understood, particularly as it cooperates with my optional form of control valve.

As shown in Figure 9, the ammunition feed control includes a housing 131 having a cylinder 132 therein that contains a feeder piston 133. A valve 134 is likewise mounted within the housing 131, and operates to connect a passageway 135 to a coupling 136 connected to a source of fluid under pressure (not shown), or to vent the passageway to the atmosphere through an exhaust port 137. The passageway 135 is connected to the interior of the cylinder 132, and the valve 134 is operated by a valve rod 138 connected to the feeder control so that when the valve moved to the left, in Figure 9, to a first position such as to close exhaust port 137 fluid under pressure passes from the connector 136, through the passageway 135, to the interior of the cylinder 132. As a result, the piston 133 is moved outwardly, toward the right in Figure 9, thus advancing the ammunition and acting to move the valve rod 138 to a second position wherein the valve 134 blocks the flow of fluid pressure from connector 136 and vents the passageway 135 through exhaust port 137. With the venting of the passageway 135, the pressure within the cylinder 132 is reduced, and the piston 133 is returned to its innermost position within the cylinder. When the gun is fired, the valve 134 is returned to its first position to close exhaust port 137, and the cycle is repeated. However, should the gun become jammed, or otherwise fail to fire, the piston 133 will be unable to move outwardly to advance the ammunition; consequently valve 134 will remain in the first position closing exhaust port 137, thus the pressure within the passageway 135 will increase. It is to be realized that during the normal operation of a gun, the operation of the piston 133 and the valve 134 will be quite rapid, and the pressure within the passageway 135 at its connection to the interior of the cylinder 132, because of normal frictional losses, will usually have a maximum value much lower than that supplied to the coupling 136. Additionally, the pressure within the passageway 135 will be pulsating during the normal operation of the gun, so that there are two different pressure conditions to be expected. In the first condition, occurring when the gun is firing normally, there is a pulsating pressure within the passageway 135, while in the second condition, occurring when the gun is stalled, there is a gradually increasing pressure within the passageway, the ultimate value of the increasing pressure being materially greater than the maximum pressure of any individual pulse.

To control the operation of the piston of the charger, I provide the control valve assembly 130, and use the pressure within the passageway 135 to operate the control valve. In many respects, the control valve assembly 130 is similar to the previously described control valve assembly 22 of the previously described charger. Wherever possible, such parts and elements have been given a similar number in the 100-series, while other elements have been given numbers in the 200-series.

Turning now to a detailed description of the control valve assembly 130 shown in Figure 9, it will be seen that this includes a housing or block 170 having a fluid coupling 171 adapted to be connected to a supply of fluid under pressure (not shown). Leading from the fluid coupling 171 is a passageway 172 that connects the coupling to a pressure chamber 173 from which there extends a bore 176. A valve seat, here shown in the form of a boss 180, surrounds the bore 176 in the pressure chamber 173, and a valve head 181 is urged toward the seat by a compression spring 182. A passageway 175 extends from the bore 176 to a fluid coupling 200, the latter being connected to the operating pressure chamber of the cylinder of the charger (not shown).

At the end of the bore 176 remote from the pressure chamber 173, I provide a valve seat here shown as a boss 184 surrounding the bore and adapted to have a sealing member 186 of a control piston 185 pressed against it to close the valve thus formed. The control piston 185 is slidably mounted within a control piston chamber 190, the end of this chamber nearest the bore 176 acting as an exhaust chamber 177. A plunger 187, similar to the plunger 87 of the previously described control valve 21, extends through the bore 176 to move the valve head 181 and the control piston 185 in synchronism.

Leading from the exhaust chamber 177 is a passageway 178 that leads to a valve chamber 201, that is connected through a normally open valve 202 to an exhaust port 203. The valve 202 is operable by a charging solenoid 198, and the valve and solenoid are connected to a normally closed valve 204 that is operable to connect the valve chamber 201 to a second pressure chamber 205. As will be seen, the valves 202 and 204 are mechanically connected together for a simultaneous operation, and a helical spring 206 may be provided to urge the valves to their normal positions. A passageway 207 extends from the second pressure chamber 205 to the first-mentioned pressure chamber 173, and consequently upon the movement of the valves 202 and 204 to closed and open positions, respectively, pressure is supplied from the first-mentioned pressure chamber 173, through passageway 207, second pressure chamber 205, and valve 204 to the passageway 178, and thence to the exhaust chamber 177.

Connected to the control piston chamber 190 is a passageway 191 that leads to a relief valve 210, the latter including a valve seat 211 and a valve body 212 that normally closes against the seat. An exhaust port 213 is located adjacent the valve seat 211 so that when the valve is open, the passageway 191 and consequently the control piston chamber 190 is subjected to the external ambient pressure.

The valve body 212 is in the form of a piston mounted in a pulse pressure chamber 214, and a fluid coupling 215 provides a means of connecting this chamber to the passageway 135 of the ammunition feed control. Within the valve body and extending axially therethrough is a restrictor passageway 216 such as may be formed by an axial bore having a threaded rod 217 therein. The helical space thus formed between the threads of the rod 217 and the bore through the valve body 212 provides a long path of small cross-sectional area through which the pressure from the passageway 135 may pass. So long as the pressure within the passageway 135 is pulsating, the restrictor passageway 216 and relief valve 210 act to damp the pulses so that the pressure within the control piston chamber 190 maintains a value intermediate the maximum and minimum pressures of the pulses.

*Operation of device shown in Figures 9–11*

In the operation of the control valve 130, the coupling 171 is connected to a supply of fluid under pressure (not shown) such as a source of compressed air. The same supply is connected to the coupling 136 of the ammunition feed control, and the passageway 135 thereof is connected to the coupling 215 as previously mentioned. The coupling 200 is connected to the cylinder of the charger mechanism, this latter being of any suitable form such as the cylinder portion 23 of the charger 21 previously described. When the gun (not shown) is not being fired, the valve 134 of the ammunition feed control is in a position closing the passageway 135 from the coupling 136, and venting the passageway so that no pressure is transmitted to the coupling 215. Consequently, the various parts within the control valve 130 are in the position shown in Figure 9, and the coupling 200 is connected through the passageway 175, the bore 176, the exhaust chamber 177 and the passageway 178 to the valve chamber 201, where it is vented through the valve 202 to the exhaust port 203. Since the fluid coupling 200 is thus vented to the atmosphere, the piston of the charger mechanism is in its normal or forward position.

Should it be desired to move the breech block to its rearward position, the charger may be operated in either of two ways. The first method requires the operation of the charging solenoid 198 by the closure of a charging switch 220, while the other method of securing the same operation requires the pushing of a button or plunger 221 that manually moves the armature 222 of the solenoid to produce the same effect as the electrical energization of the solenoid. In either case, the movement of the armature of the solenoid results in the movement of the valves 202 and 204 so that the normally open valve 202 is closed, and the normally closed valve 204 is simultaneously opened.

In this way, the exhaust chamber 177 is no longer connected to the exhaust port 203, but instead is connected to the pressure chamber 173, in the manner previously described. As a result, the full pressure of the supply means (not shown) is transmitted through the coupling 200 to the cylinder of the charger, thereby moving the breech slide rearwardly, and maintaining it in this rearward position so long as the armature 222 is held in its valve operating position. Since no means is provided for automatically releasing the pressure in the charger cylinder or in the control valve assembly 130 under these conditions, the breech block slide may be held in its rearward position as long as desired. Upon the release of the solenoid armature 222, the valves 202 and 204 are returned to their normal positions, thereby disconnecting the exhaust chamber 177 from the pressure chamber 173, and instead venting the exhaust chamber through the port 203. This, it will be recognized, releases the pressure within the charger cylinder so that the piston thereof is returned to its normal, forward position.

During the normal operation of the gun, the charging solenoid 198 is de-energized, and the various valves are in the position shown in Figure 9. Consequently, the interior of the charger cylinder is connected through the coupling 200, the exhaust chamber 177, and the valve 202 to the exhaust port 203, all as previously described. A pulsating pressure is supplied through the passageway 135 to the coupling 215, and the restrictor passageway 216 and relief valve 210 act to damp this pressure so that an intermediate pressure, lower than that provided by the supply means connected to the coupling 171, is applied to the control piston chamber 190. Consequently, the helical spring 182, aided by the pressure from the supply means, urges the piston head 181 against the valve seat 180, thereby maintaining the exhaust passageways from the coupling 200 open.

However, should the gun fail to fire, the piston 133 of the ammunition feed control will be unable to move outwardly to advance the ammunition and the full pressure developed by the pressure supply means and applied to the coupling 136 will be delivered to the passageway 135, as previously described. Since there is no appreciable flow of the fluid through this passageway, substantially the full pressure of the supply means will be delivered to the pulse pressure chamber 214, and this pressure will be transmitted through the restrictor passageway 216 to the control piston chamber 190. Eventually the pressure within this chamber will equal the full value of the pressure applied at the coupling 136, which is substantially equal to the pressure applied at the fluid coupling 171. However, the effective area of the control piston 185 is greater than the effective area of the valve head 181, and consequently a resultant force is applied to the plunger 187 that moves it and the valve head 181, against the urging of the spring 182, toward the fluid coupling 171. As this occurs, the valve head 181 is moved away from the valve seat 180, thereby admitting fluid under pressure into the bore 176, and simultaneously the control piston 185 has its sealing member moved against the valve seat 184, thereby closing the bore from the exhaust chamber 177. At the conclusion of this movement, the fluid coupling 200 is no longer connected through the exhaust chamber 177, the passageway 178, and the valve 202 to the exhaust port 203, but instead is connected to the pressure chamber 173 so that fluid under pressure is delivered to the cylinder of the gun charger. When this occurs, the piston of the charger is moved rearwardly to charge the gun, thereby permitting the operation of the ammunition feed, and the outward movement of the piston 133 of the ammunition feed control. The condition of the control valve 130 at this stage of the operation is shown in Figure 10, where it will be seen that the exhaust valve including the valve seat 184 and sealing member 186 is closed, the pressure valve including the valve seat 180 and the valve head 181 is open, the valve 202 is open, and the normally closed valve 204 is closed. Likewise, the relief valve 210 is closed, though the restrictor passageway 216 is open, as it is at all times.

Upon the outward movement of the piston 133 of the ammunition feed control, the pressure within the passageway 135 is decreased, and consequently the pressure within the pulse pressure chamber 214 is likewise decreased. However, the pressure within the control piston chamber 190 and within the passageway 191, because of the small capacity of the restrictor passageway 216, does not decrease so rapidly, and consequently the valve body 212 is urged upwardly, away from the passageway 191, to open the relief valve 210. When this occurs, a fluid connection is established between the passageway 191 and the exhaust port 213, as indicated in Figure 11, and the chamber 190 is thus exhausted to the atmosphere. As a result, the control piston 185 is no longer able to overcome the urging of the helical spring 182, and the latter thus returns the piston head 181, the plunger 187, and the control piston 185 to their original positions. As soon as the pressure within the chamber 190 and the passageway 191 is materially reduced, the valve body 212 returns to its original position where it bears against the valve seat 211, thereby closing the exhaust port 213.

It will be noted that in this form of my control valve assembly, the operation of all elements is controlled, during the firing of the associated gun, by fluid under pressure such as compressed air. Consequently, with the exception of the previously-mentioned switch 220 and the single conductor from it to the solenoid 198, no additional wiring is necessary. The other connection to the solenoid 198, it will be understood, is through the frame of the supporting structure of the aircraft. However, to prevent the operation of the solenoid 198 during the firing of the gun, the customary firing relay 223, controlled by a switch 224, is provided with a pair of normally closed contacts 225 that are connected in series with the switch 220 so that when the firing switch 224 is closed, the circuit to the charging solenoid 198 is opened, regardless of the position of the switch 220.

From the foregoing, it will be seen that I have provided an automatic gun charger and control means therefor fully capable of achieving the objects and possessing the advantages heretofore set forth. While I have shown and described a preferred and optional form of my device, it will be apparent that modifications may be made therein without departing from the broad concept of the invention as herein set forth. Consequently, I do not wish to be restricted to the particular form or arrangement of parts herein described and shown, except as limited by my claims.

I claim:

1. A gun charger for a gun having a breech block slide, said gun charger including: a cylinder; a first valve means for connecting said cylinder to a source of fluid pressure, said first valve means including a normally closed valve with a control piston coupled thereto, said control piston being movable in response to fluid pressure of a predetermined value for opening said normally closed valve, and means for applying fluid pressure from said source to said control piston; a drive piston within said cylinder normally held in a first position, but movable to a second position in said cylinder by fluid pressure from said source when said normally closed valve is opened by said control piston; a relief valve responsive to firing of the gun for releasing fluid pressure applied to the control piston so as to prevent said control piston from opening the normally closed valve of the first valve means while the gun is firing, said relief valve being conditioned to remain closed when the gun fails to fire so that fluid pressure applied to said control piston from the fluid pressure source is allowed to reach the predetermined value for opening said normally closed valve to effect movement of the drive piston; and actuating means for coupling said drive piston to the breech block slide of the gun for charging said gun when said drive piston is moved from said first position to said second position.

2. A gun charger for a gun having a breech block slide, said gun charger including: a cylinder; first valve means for connecting said cylinder to a source of fluid pressure and for exhausting fluid pressure from said cylinder, said first valve means including a normally closed inlet valve and a normally open exhaust valve communicating with the cylinder, said valves being interconnected for concurrent operation, whereby the opening of one of said valves occurs substantially simultaneously with the closing of the other of said valves, a control piston coupled to said normally closed inlet valve, said control piston being movable in response to fluid pressure of a predetermined value for opening said normally closed inlet valve and for closing said normally open exhaust valve, and means for restrictedly applying fluid pressure from said source to said control piston; a drive piston within said cylinder normally held in a first position, but movable to a second position in said cylinder by fluid pressure from said source when said inlet valve is opened and said exhaust valve is closed by said control piston; a relief valve responsive to firing of the gun for releasing fluid pressure applied to the control piston so as to prevent said control piston from opening the normally closed inlet valve of the first valve means while the gun is firing, said relief valve being conditioned to remain closed when the gun fails to fire so that fluid pressure applied to said control piston is allowed to reach the predetermined value for opening said normally closed inlet valve to effect movement of the drive piston; and actuating means for coupling said drive piston to the breech block slide of said gun for charging the gun when said drive piston is moved from said first position to said second position.

3. In a fluid operated gun charger having a cylinder with a piston therein normally held in a first position, but movable to a second position and back to the first position for charging a gun, having a remote firing control, a control valve assembly for connecting the cylinder of said charger to a source of fluid pressure, said control valve assembly including: a housing; a chamber within said housing fluid-conductively connectable to the gun charger cylinder; a normally open exhaust valve venting said chamber; a normally closed inlet valve for connecting said chamber to a source of fluid pressure; first means mechanically interconnecting said exhaust and inlet valves to cause substantially simultaneous movement of both valves, whereby the closing of one of said valves is accompanied by the opening of the other of said valves; fluid-pressure actuated means coupled to one of said valves for closing said normally open exhaust valve; second means connectable to the firing control of the gun for supplying increscent fluid pressure from said source of fluid pressure to said pressure actuated means when the firing control is actuated; and a relief valve connectable to the gun, and operable in response to the firing of said gun for releasing the fluid pressure supplied to said pressure actuated means by said second means each time the gun is fired.

4. The control valve assembly defined in claim 3 which further includes selectively operable means for supplying fluid pressure to the cylinder of the gun charger for moving the piston in said cylinder from the first position to the second position for charging the gun independently of the firing operation of said gun.

5. In a fluid operated gun charger having a cylinder with a piston therein normally held in a first position, but movable to a second position and back to the first position for charging a gun having a remote firing control, a control valve assembly for connecting the cylinder of said charger to a source of fluid pressure, said control valve assembly including: a housing; a chamber within said housing fluid-conductively connectable to said cylinder; a normally open exhaust valve venting said chamber; a normally closed inlet valve for connecting said chamber to a source of fluid pressure; first means linking said exhaust and inlet valves for transmitting movement of one of said valves to the other of said valves, whereby the closing of one of said valves is accompanied by the opening of the other of said valves; a spring for holding said exhaust and inlet valves in their normal positions; a control piston connected to one of said valves for closing said normally open exhaust valve; fluid pressure control means connectable to the firing control of the gun for supplying increscent fluid pressure to said control piston from said source of fluid pressure when said firing control is actuated; and a relief valve connectable to the gun, and operable in response to the firing of said gun for releasing the fluid pressure supplied to said control piston by said control means each time the gun is fired.

6. In a fluid operated gun charger having a cylinder with a piston therein normally held in a first position, but movable to a second position and back to the first position for charging a gun having a breech block slide and a remote firing control, a control valve assembly for connecting the cylinder of said charger to a source of fluid pressure, said control valve assembly including: a housing; a chamber within said housing fluid-conductively connectable to said cylinder; a normally open exhaust valve venting said chamber; a normally closed inlet valve for connecting said chamber to a source of fluid pressure; first means linking said exhaust and inlet valves for transmitting movement of one of said valves to the other of said valves, whereby the closing of one of said valves is accompanied by the opening of the other of said valves; a spring bearing against one of said valves for holding said exhaust and inlet valves in their normal positions; a control piston connected to one of said valves for closing said normally open exhaust valve; and second means for supplying fluid pressure to said control piston from said source of fluid pressure, said second means including a restricted passageway, a normally closed charging valve, and actuating means for said charging valve connectable to the firing control of the gun for supplying a restricted flow of fluid pressure to said control piston from said source of fluid pressure when said firing control is actuated, and a normally closed relief valve for releasing the fluid pressure supplied to said control piston by said second means each time the gun is fired, said relief valve being connectable to said gun for actuation by the breech block slide of said gun, whereby said relief valve is momentarily opened in response to the functioning of said breech block slide each time the gun is fired.

7. In a fluid operated gun charger having a cylinder with a piston therein normally held in a first position, but movable to a second position and back to the first position for charging a gun having a remote firing control, a control valve assembly for connecting the cylinder of said charger to a source of fluid pressure, said control valve assembly including: a housing; a pressure chamber within said housing adapted for connection to a source of fluid pressure; a valve chamber within said housing adapted for connection to the cylinder of said gun charger; a normally open first valve venting said valve chamber; a normally closed second valve for connecting said valve chamber to said pressure chamber; a plunger within said valve chamber extending between said first and second valves for transmitting the movement of one of said valves to the other of said valves whereby the closing of one of said valves is accompanied by the opening of the other of said valves; a spring bearing against one of said valves for holding said first and second valves in their normal positions; a control piston connected to one of said valves for closing said normally open first valve; and control means for supplying increscent fluid pressure to said control piston from said pressure chamber when the gun firing control is actuated, said control means including a fluid-conducting passageway communicating with the pressure chamber and the control piston, a restriction in said passageway, a charging valve normally closing said passageway, and means connectable to the gun firing control for opening said charging valve when said gun firing control is actuated.

8. In a fluid operated gun charger having a cylinder with a piston therein normally held in a first position, but movable to a second position and back to the first position for charging a gun having a breech block slide and a remote firing control, a control valve assembly for connecting the cylinder of said charger to a source of fluid pressure, said control valve assembly including: a housing; a pressure chamber within said housing adapted for connection to a source of fluid pressure; a valve chamber within said housing adapted for connection to the cylinder of said gun charger; a normally open first valve venting said valve chamber; a normally closed second valve for connecting said valve chamber to said pressure chamber; a plunger within said valve chamber extending between said first and second valves for transmitting the movement of one of said valves to the other of said valves, whereby the closing of one of said valves is accompanied by the opening of the other of said valves; a spring bearing against one of said valves for holding said first and second valves in their normal positions; a piston chamber having a control piston therein connected to one of said valves for closing said first valve and opening said second valve; control means for admitting fluid pressure into said piston chamber from said pressure chamber for actuating said control piston, said control means including a restricted passageway, a normally closed charging valve, and actuating means for said charging valve connectable to the firing control of the gun for admitting a restricted flow of fluid pressure into said piston chamber when the firing control is actuated; a normally closed relief valve for releasing the fluid pressure admitted into said piston chamber by said control means each time the gun is fired, said relief valve being connectable to said gun for actuation by the breech block slide of said gun, whereby said relief valve is momentarily opened in response to the functioning of said breech block slide each time the gun is fired; manually operable means for opening said normally closed charging valve independent of the operation of said actuating means; and a normally closed firing valve to prevent said relief valve from releasing fluid pressure admitted into said piston chamber when said charging valve is opened by said manually operable means, said normally closed firing valve being connectable to the firing control of the gun for simultaneous operation with said charging valve when said firing control is actuated, whereby a restricted flow of fluid pressure is admitted into said piston chamber when said firing control is actuated and said relief valve releases the fluid pressure admitted by said charging valve in response to the firing of the gun.

9. A gun charger for a gun having a breech block slide and a firing control, said gun charger comprising: a cylinder; a double-acting piston slidable within said cylinder for moving said breech block slide to charge the gun, said double-acting piston having first and second surfaces; first means adapted for connection to a source of fluid pressure for applying fluid pressure to the first surface of said double-acting piston, whereby said double acting piston is normally held in a first position in said cylinder; control means adapted to be connected to said source of fluid pressure for applying fluid pressure to the second surface of said double-acting piston for moving said double acting piston from said first position to a second position for moving the breech block slide of the gun, and to permit said double-acting piston to return to said first position under the influence of the fluid pressure applied to the first surface of said piston by said first means after the gun has been charged, said control means including a housing, a valve chamber within said housing fluid connected to said cylinder, a normally open first valve venting said valve chamber, a normally closed second valve for connecting said valve chamber to the source of fluid pressure, second means mechanically interconnecting said first and second valves to permit substantially simultaneously movement of both valves, whereby the closing of one of said valves is accompanied by the opening of the other of said valves, fluid-pressure actuated means coupled to one of said valves for closing said first valve and opening said second valve, third means connectable to the firing control of the gun for supplying fluid pressure from said source of fluid pressure to said fluid-pressure actuated means when said firing control is actuated, and a relief valve connectable to the gun, and operable in response to the firing of said gun for releasing the fluid pressure supplied to said pressure actuated means by said third means each time the gun is fired; and coupling means for connecting said double-acting piston to the breech block slide of said gun when said double-acting piston is moved from said first position to said second position and returned to said first position.

10. A gun charger for a gun having a breech block slide and a firing control, said gun charger comprising: a cylinder; a double-acting piston slidable within said cylinder for moving the breech block slide to charge the gun, said double-acting piston having opposed first and second surfaces; first means adapted for connection to a source of fluid pressure for applying fluid pressure to the first surface of said double-acting piston, whereby said double-acting piston is moved to and normally held in a first position in said cylinder; control means adapted to be connected to said source of fluid pressure for applying fluid pressure to the second surface of said double-acting piston for moving said double-acting piston from said first position to a second position for moving the breech block slide of the gun, and to permit said double-acting piston to return to said first position under the influence of the fluid pressure applied to the first surface of said piston by said first means after the gun has been charged, said control means including a housing, a pressure chamber within said housing adapted for connection to the source of fluid pressure, a valve chamber within said housing fluid connected to said cylinder, a normally open first valve venting said valve chamber, a normally closed second valve for connecting said valve chamber to said pressure chamber, a plunger within said valve chamber extending between said first and second valves for transmitting the movement of one of said valves to the other of said valves whereby the closing of one of said valves is accompanied by the opening of the other of said valves, a spring bearing against one of said valves for holding said first and second valves in their normal positions, a piston chamber within said housing, a control piston in said piston chamber connected to one of said valves for moving said first and second valves against the force of said spring, a restricted passageway interconnecting said pressure chamber and said piston chamber, a normally closed charging valve blocking said passageway, actuating means for said charging valve connectable to the firing control of the gun for opening said charging valve to admit a restricted flow of fluid pressure into said piston chamber when said firing control is actuated, a normally closed relief valve for releasing the fluid pressure admitted into said piston chamber by said charging valve each time the gun is fired, said relief valve being connectable to the gun for momentary actuation by the breech block slide of said gun each time the gun is fired, manually operable means for opening said normally closed charging valve independent of the operation of said actuating means, and a normally closed firing valve to prevent said relief valve from releasing fluid pressure admitted into said piston chamber when said charging valve is opened by said manually operable means, said normally closed firing valve being connectable to the firing control of the gun for simultaneous operation with said charging valve when the firing control is actuated whereby a restricted flow of fluid pressure is admitted into said piston chamber when said firing control is actuated and said relief valve releases the fluid pressure admitted by said charging valve in response to the actuation of the breech block slide; coupling means for connecting said double-acting piston to the breech block slide of the gun when said piston is moved from said first position to said second position and returned to said first position, said coupling means including a drive lug pivotally mounted on said double-acting piston, said drive lug having forward and rearward arms projecting from said cylinder for drivingly engaging the breech block slide and actuating said relief valve respectively, said rearward arm being normally removed from the path of movement of said slide, but movable into said path of movement upon rotation of said drive lug for operative engagement with the relief valve, said drive lug being rotated upon engagement of said forward arm with the breech block slide when said double-acting piston moves toward said second position; and releasable latching means for engaging said drive lug to hold said lug in rotated position until said double-acting piston returns to said normally held first position.

11. A control valve assembly for a fluid operated gun charger having a cylinder with a piston therein normally held in a first position, but movable to a second position and back to the first position for charging a gun having a fluid-driven ammunition feed with an ammunition feed control which provides a pulsating fluid pressure during the normal operation of the gun and a non-pulsating fluid pressure upon the stalling of said gun, said ammunition feed control having a single outlet for the pulsating and nonpulsating fluid pressures, said control valve assembly including: a housing; a valve chamber within said housing adapted for connection to the cylinder of the gun charger; a normally open first valve venting said valve chamber; a normally closed second valve for connecting said valve chamber to a source of fluid pressure; first means linking said first and second valves for transmitting the movement of one of said valves to the other of said valves, whereby the closing of one of said valves is accompanied by the opening of the other of said valves; a spring bearing against one of said valves for holding said first and second valves in their normal positions; a control piston connected to one of said valves for closing said normally open first valve; second means connectable to the outlet of the ammunition feed control for supplying the pulsating and nonpulsating fluid pressures from the feed control to said control piston, said second means including a passageway having a restriction therein, said restriction being operable to dampen the effect of the pulsating pressure on said control piston when the gun is operating normally, and to slowly apply the nonpulsating pressure to said control piston when the gun is stalled; and a normally closed relief valve for releasing the non-pulsating pressure applied to said control piston when the stalled condition of the gun is corrected.

12. A control valve assembly for a fluid-operated gun charger having a cylinder with a piston therein normally held in a first position, but movable to a second position and back to the first position for charging a gun having a fluid-driven ammunition feed with an ammunition feed control which provides a pulsating fluid pressure during the normal operation of said gun and a nonpulsating fluid pressure upon the stalling of said gun, said ammunition feed control having a single outlet for the pulsating and the nonpulsating fluid pressures, said control valve assembly including: a housing; a valve chamber within said housing adapted for connection to the cylinder of the gun charger; a normally open first valve venting said valve chamber; a normally closed second valve for connecting said valve chamber to a source of fluid pressure; first means linking said first and second valves for transmitting the movement of one of said valves to the other of said valves, whereby the closing of one of said valves is accompanied by the opening of the other of said valves; a spring bearing against one of said valves for holding said first and second valves in their normal positions; a control piston connected to one of said valves for closing said normally open first valve; second means for supplying the pulsating and nonpulsating fluid pressures from the outlet of the ammunition feed control to said control piston, said second means including a pulse pressure chamber within said housing adapted for connection to said outlet, restrictor means having a restricted passageway for conducting fluid pressure from said pulse pressure chamber to said control piston, said restrictor means being operable to dampen the pressure pulsations from the ammunition feed control and prevent the pulsating pressure from moving said control piston when the gun is operating normally, said restrictor means also being operable to permit the nonpulsating pressure from the ammunition feed control to move said control piston for closing said normally open first valve when the gun is stalled; and a normally closed relief valve operable in response to the difference in value between the fluid pressure applied to said control piston and the fluid pressure provided by the ammunition feed control for releasing the fluid pressure applied to said control piston, whereby said first and second valves are permitted to return to their normal positions when the stalled condition of the gun is corrected.

13. A control valve assembly for a fluid-operated gun charger having a cylinder with a piston therein normally held in a first position, but movable to a second position and back to the first position for charging a gun having a fluid-driven ammunition feed with an ammunition feed control which provides a pulsating fluid pressure during the normal operation of the gun and a nonpulsating fluid pressure upon the stalling of the gun, said ammunition feed control having a single outlet for the pulsating and the nonpulsating fluid pressures, said control valve assembly including: a housing; a pressure chamber within said housing adapted for connection to a source of fluid pressure; a valve chamber within said housing adapted for connection to the cylinder of the gun charger; a normally open first valve venting said valve chamber; a normally closed second valve for connecting said valve chamber to said pressure chamber; a plunger within said valve chamber extending between said first and second valves for transmitting the movement of one of said valves to the other of said valves, whereby the closing of one of said valves is accompanied by the opening of the other of said valves; a spring bearing against one of said valves for holding said first and second valves in their normal positions; a piston chamber within said housing; a control piston in said piston chamber coupled to one of said valves for moving said first and second valves against the force of said spring; first means for supplying fluid pressure from the outlet of the ammunition feed control to said piston chamber, said first means including a pulse pressure chamber within said housing adapted for connection to said outlet, restrictor means having a restricted passageway for conducting fluid pressure from said pulse pressure chamber to said piston chamber, said restrictor means being operable to dampen the pressure pulsations from the ammunition feed control and prevent the pulsating pressure from rising to a value within said piston chamber sufficient to move said control piston, said restrictor means also being operable to permit the nonpulsating pressure from the ammunition feed control to rise to a value within said piston chamber sufficient to move said control piston for closing said normally open first valve; and a normally closed relief valve operable in response to the difference in value between the fluid pressure in said piston chamber and the fluid pressure being provided by the ammunition feed control for releasing the fluid pressure in said piston chamber, whereby said first and second valves are permitted to return to their normal positions when the stalled condition of the gun is corrected and the nonpulsating pressure from the ammunition feed control is replaced by the pulsating pressure.

14. A control valve assembly for a fluid-operated gun charger having a cylinder with a piston therein normally held in a first position, but movable to a second position and back to the first position for charging a gun having a fluid-driven ammunition feed with an ammunition feed control which provides a pulsating fluid pressure during the normal operation of the gun and a nonpulsating fluid pressure upon the stalling of the gun, said ammunition feed control having a single outlet for the pulsating and the nonpulsating fluid pressures, said control valve assembly including: a housing; a pressure chamber within said housing adapted for connection to a source of fluid pressure; a valve chamber within said housing adapted for connection to the cylinder of the gun charger; a normally open first valve venting said valve chamber; a normally closed second valve for connecting said valve chamber to said pressure chamber; a plunger within said valve chamber extending between said first and second valves for transmitting the movement of one of said valves to the other of said valves, whereby the closing of one of said valves is accompanied by the opening of the other of said valves; a spring bearing against one of said valves for holding said first and second valves in their normal positions; a piston chamber within said housing; a control piston in said piston chamber coupled to one of said valves for moving said first and second valves against the force of said spring; a pulse pressure chamber within said housing adapted for connection to the outlet of the ammunition feed control; a first passageway connecting said pulse pressure chamber and said piston chamber; an exhaust port; a pulse pressure piston within said pulse pressure chamber, said pulse pressure piston being normally held in a blocking position for blocking said first passageway and said exhaust port, but movable from said blocking position for unblocking said first passageway and said exhaust port for quickly releasing fluid pressure from within said piston chamber; a second passageway through said pulse pressure piston; and restrictor means in said second passageway for restricting the flow of fluid pressure from said pulse pressure chamber to said piston chamber, said restrictor means being operable to dampen the pressure pulsations from the ammunition feed control and prevent the pulsating pressure from moving said control piston when the gun is operating normally, said restrictor means also being operable to permit the nonpulsating pressure from the ammunition feed control to move said control piston upon the stalling of the gun.

15. A control valve assembly for a fluid-operated gun charger having a cylinder with a piston therein normally held in a first position, but movable to a second position and back to the first position for charging a gun having a fluid-driven ammunition feed with an ammunition feed control which provides a pulsating fluid pressure during the normal operation of the gun and a nonpulsating fluid pressure upon the stalling of the gun, said ammunition feed control having a single outlet for the pulsating and the nonpulsating fluid pressures, said control valve assembly including: a housing; a valve chamber within said housing adapted for connection to the cylinder of the gun charger; a normally open first valve venting said valve chamber; a normally closed second valve for connecting said valve chamber to a source of fluid pressure; first means for mechanically interconnecting said first and second valves, whereby the closing of one of said valves is accompanied by the opening of the other of said valves; a spring bearing against one of said valves for holding said valves in their normal positions; a control piston connected to one of said valves for closing said normally open first valve; second means connectable to the outlet of said ammunition feed for supplying fluid pressures from said outlet to said control piston, said second means including a passageway having a restriction therein, said restriction being operable to dampen the effect of the pulsating pressure on said control piston when the gun is operating normally, and to slowly apply the nonpulsating pressure to said control piston when the gun is stalled; a normally closed relief valve for releasing the nonpulsating pressure applied to said control piston when the stalled condition of the gun is corrected and the nonpulsating pressure from the ammunition feed control is reduced; and manually controllable valve means normally cooperating with said first valve to vent said valve chamber, said valve means being selectively operable for connecting said valve chamber to said source of fluid pressure independently of the opening of said normally closed second valve by said control piston.

16. A control valve assembly for a fluid-operated gun charger having a cylinder with a piston therein normally held in a first position, but movable to a second position and back to the first position for charging a gun having a fluid-driven ammunition feed with a feed control mechanism which provides a pulsating fluid pressure during the normal operation of the gun and a nonpulsating fluid pressure upon the stalling of the gun, said feed control mechanism having a single outlet for the pulsating and the nonpulsating fluid pressures, said control valve assembly including: a housing; a pressure chamber within said housing adapted for connection to a source of fluid pressure; a valve chamber within said housing adapted for connection to the cylinder of the gun charger; a normally open first valve venting said valve chamber; a normally closed second valve for connecting said valve chamber to said pressure chamber; a plunger within said valve chamber extending between said first and second valves for transmitting the movement of one of said valves to the other of said valves, whereby the closing of one of said valves is accompanied by the opening of the other of said valves; a spring bearing against one of said valves for holding said first and second valves in their normal positions; a piston chamber within said housing; a control piston in said piston chamber coupled to one of said valves for moving said first and second valves against the force of said spring; a pulse pressure chamber within said housing adapted for connection to the outlet of the feed control mechanism; a first passageway connecting said pulse pressure chamber and said piston chamber; an exhaust port; a pulse pressure piston within said pulse pressure chamber, said pulse pressure piston being normally held in a blocking position for blocking said first passageway and said exhaust port, but movable from said blocking position for unblocking said first passageway and said exhaust port for quickly releasing fluid pressure from within said piston chamber; a second passageway through said pulse pressure piston; restrictor means in said second passageway for restricting the flow of fluid pressure from said pulse pressure chamber to said piston chamber, said restrictor means being operable to dampen the pressure pulsations from the feed control mechanism and prevent the pulsating pressure from moving said control piston, said restrictor means also being operable to permit the nonpulsating pressure from the feed control mechanism to move said control piston upon the stalling of the gun; and a manually controllable valve means normally cooperating with said first valve to vent said valve chamber, said valve means including a transfer chamber fluid connected to said valve chamber, a normally open vent valve venting said transfer chamber, and a normally closed pressure valve for connecting said transfer chamber to said pressure chamber, said valve means being selectively operable for simultaneously closing said vent valve and opening said inlet valve to prevent the venting of said valve chamber and to fluid connect said valve chamber to said pressure chamber independently of the operation of said first and second valves by said control piston.

17. A gun charger for a gun having a breech block slide and a fluid-driven ammunition feed with a feed control mechanism, which ammunition feed control mechanism provides a pulsating fluid pressure during the normal operation of the gun and a nonpulsating pressure upon the stalling of the gun, said feed control mechanism having a single outlet for the pulsating and nonpulsating pressures, said charger comprising: a cylinder; a double-acting piston slidable within said cylinder for moving the breech block slide to charge the gun, said double-acting piston having opposed first and second surfaces; first means adapted for connection to a source of fluid pressure for applying fluid pressure to the first surface of said double-acting piston, whereby said double-acting piston is moved to and normally held in a first position in said cylinder; control means adapted to be connected to said source of fluid pressure for applying fluid pressure to the second surface of said double-acting piston for moving said double-acting piston from said first position to a second position for moving the breech block slide of the gun, and to permit said double-acting piston to return to said first position under the influence of the fluid pressure applied to the first surface of said piston by said first means as the gun is being charged, said control means including a housing, a pressure chamber within said housing adapted for connection to said source of fluid pressure, a valve chamber within said housing fluid connected to said cylinder, a normally open first valve venting said valve chamber, a normally closed second valve for connecting said valve chamber to said pressure chamber, a plunger within said valve chamber interconnecting said first and second valves for the simultaneous movement thereof, whereby the closing of one of said valves is accompanied by the opening of the other of said valves, a spring bearing against one of said valves for holding said first and second valves in their normal positions, a piston chamber within said housing, a control piston in said piston chamber connected to one of said valves for moving said first and second valves against the force of said spring, a pulse pressure chamber within said housing adapted for connection to the outlet of the feed control mechanism, a first passageway connecting said pulse pressure chamber and said piston chamber, an exhaust port, a pulse pressure piston within said pulse pressure chamber normally held in a blocking position for blocking said first passageway and said exhaust port, said pulse pressure piston being movable from said blocking position for unblocking said first passageway and said exhaust port for quickly releasing fluid pressure from within said piston chamber, a second passageway through said pulse pressure piston, restrictor means in said second passageway for restricting the flow of fluid pressure from said pulse pressure chamber to said piston chamber, said restrictor means being operable to dampen the pressure pulsations from the feed control mechanism and prevent the pulsating pressure from moving said control piston during the normal operation of said gun, said restrictor means also being operable to permit the nonpulsating pressure from the feed control mechanism to move said control piston upon the stalling of said gun; a manually controllable valve means normally cooperating with said first valve to vent said valve chamber, said valve means including a transfer chamber fluid connected to said valve chamber, a normally open vent valve venting said transfer chamber, and a normally closed pressure valve for connecting said transfer chamber to said pressure chamber, said valve means being selectively operable for simultaneously closing said vent valve and opening said inlet valve to prevent the venting of said valve chamber and to fluid connect said valve chamber to said pressure chamber independently of the operation of said first and second valves by said control piston; and coupling means for connecting said double-acting piston to the breech block slide of the gun for moving said breech block slide to charge said gun when said double-acting piston is moved from said first position to said second position.

18. In a charger for a gun having a breech block mechanism normally operable for ejecting a spent cartridge and chambering a live cartridge in response to the firing of the gun, the combination of means for automatically actuating the breech block mechanism when the gun fails to fire, said means including: a drive piston engageable with the breech block mechanism, said drive piston being normally held in a first position, but movable to a second position and back to the first position in response to fluid pressure applied thereto for actuating the breech block mechanism; a normally closed valve for applying fluid pressure to said drive piston; a control piston operable in response to increscent fluid pressure for opening said normally closed valve when such fluid pressure attains a predetermined value; a flow regulator for applying a regulated flow of fluid pressure to said control piston; and a relief valve operable in response to the firing of the gun for releasing fluid pressure applied to said control piston; said flow regulator and said relief valve being cooperative to prevent the increscent fluid pressure applied to said control piston from attaining said predetermined value when the gun is fired, so as to allow said normally closed valve to remain closed during normal firing of the gun, and cooperative to allow the increscent fluid pressure applied to said control piston to attain said predetermined value for opening said normally closed valve to apply fluid pressure to the drive piston when the gun fails to fire.

19. In a charger for a gun having a breech block mechanism normally operable for ejecting a spent cartridge and chambering a live cartridge in response to the firing of the gun, the combination of means for automatically actuating the breech block mechanism when the gun fails to fire, said means including: a cylinder; a drive piston in said cylinder engageable with the breech block mechanism, said drive piston being normally held in a first position in said cylinder, but movable to a second position therein and back to said first position in response to fluid pressure applied thereto; and a control valve assembly for connecting said cylinder to a source of fluid pressure, said control valve assembly including a normally closed inlet valve for admitting fluid pressure from said source into said cylinder for moving said drive piston to said second position, a control piston operable in response to increscent fluid pressure for opening said inlet valve when such fluid pressure attains a predetermined value, a restrictor for applying a regulated flow of fluid pressure to said control piston, and a relief valve responsive to the firing of the gun for preventing the increscent fluid pressure applied to said control piston from attaining said predetermined value, said relief valve being conditioned to remain closed upon failure of the gun to fire so that increscent fluid pressure applied to said control piston is allowed to attain said predetermined value, whereby said normally closed valve remains closed when the gun is firing normally and is opened when the gun fails to fire.

20. A gun charger for a gun having a breech block slide, said gun charger comprising: a cylinder; first valve means for connecting said cylinder to a source of fluid pressure, said first valve means including a normally closed valve with a control piston coupled thereto, said control piston being movable in response to fluid pressure of predetermined value for opening said normally closed valve, and means for applying fluid pressure from said source to said control piston; a drive piston within said cylinder normally held in a first position, but movable to a second position in said cylinder by fluid pressure from said source when said normally closed valve is opened by said control piston; a relief valve responsive to firing of the gun for releasing fluid pressure applied to the control piston so as to prevent said control piston from opening the normally closed valve of the first valve means while the gun is firing, said relief valve being conditioned to remain closed when the gun fails to fire so that fluid pressure applied to said control piston from the fluid pressure source is allowed to reach the predetermined value for opening said normally closed valve to effect movement of the drive piston; and actuating means for coupling said drive piston to the breech block slide of the gun for charging said gun when said drive piston is moved from said first position to said second position, said actuating means comprising a drive lug pivotally mounted on the drive piston having forward and rearward arms projecting from said cylinder for drivingly engaging the breech block slide of the gun and actuating said relief valve, respectively, said rearward arm being normally removed from the path of movement of said slide, but movable into said path of movement upon rotation of said drive lug for operative association with the relief valve, said drive lug being rotated upon engagement of said forward arm with said slide when said drive piston moves toward said second position for charging said gun, and releasable latching means for engaging the drive lug to hold said lug in rotated position until said drive piston returns to its normally held first position.

21. A gun charger for a gun having a breech block slide, said gun charger including: a cylinder; first valve means for connecting the cylinder to a source of fluid pressure and for exhausting fluid pressure from said cylinder, said first valve means including a normally closed inlet valve and a normally open exhaust valve communicating with the cylinder and interconnected for concurrent operation, such that the opening of one of said valves occurs substantially simultaneously with the closing of the other of said valves, a control piston coupled to said normally closed inlet valve, said control piston being movable in response to fluid pressure of a predetermined value for opening said normally closed inlet valve and for closing said normally open exhaust valve, and means including a restricted passageway for restrictedly applying fluid pressure from said source to said control piston; a drive piston within said cylinder normally held in a first position, but movable to a second position in said cylinder by fluid pressure from said source when the inlet valve is opened and the exhaust valve is closed by the control piston; a relief valve responsive to firing of the gun for releasing fluid pressure applied to the control piston so as to prevent said control piston from opening the normally closed inlet valve of the first valve means while the gun is firing, said relief valve being conditioned to remain closed when the gun fails to fire so that fluid pressure applied to said control piston is allowed to reach the predetermined value for opening said normally closed inlet valve to effect movement of the drive piston; and actuating means for coupling the drive piston to the breech block slide of the gun for charging said gun when said drive piston is moved from the first position to the second position, said actuating means comprising a drive lug pivotally mounted on the drive piston having forward and rearward arms projecting from said cylinder for drivingly engaging the breech block slide of the gun and actuating the relief valve, respectively, said rearward arm being normally removed from the path of movement of said slide, but movable into said path of movement upon rotation of said drive lug for operative association with the relief valve, said drive lug being rotated upon engagement of said forward arm with said slide when said drive piston moves toward said second position for charging said gun, and releasable latching means for engaging the drive lug to hold said lug in rotated position until said drive piston returns to its normally held first position.

22. In a fluid operated gun charger having a cylinder with a piston therein normally held in a first position, but movable to a second position and back to the first position for charging a gun having a breech block slide and a remote firing control, a control valve assembly for connecting the cylinder of said charger to a source of fluid pressure, said control valve assembly including: a housing having a chamber fluid-conductively connectable to the gun charger cylinder; a normally open exhaust valve venting the chamber; a normally closed inlet valve for connecting the chamber to a source of fluid pressure; first means linking said exhaust and inlet valves such that movement of one is transmitted to the other, whereby the closing of one of said valves is accompanied by the opening of the other of said valves; a spring for holding the exhaust and inlet valves in their normal position, said spring bearing against one of said valves; a control piston connected to one of said valves for closing the normally open exhaust valve; second means for supplying fluid pressure from the fluid pressure source to the control piston, said second means comprising a restricted passageway, a normally closed charging valve, and actuating means for said charging valve connectable to the firing control of the gun for supplying a restricted flow of fluid pressure to said control piston from the source of fluid pressure when said firing control is actuated, and a normally closed relief valve for releasing fluid pressure supplied to said control piston by the second means each time the gun is fired, said relief valve being connectable to the gun for actuation by the breech slide of said gun, whereby said relief valve is momentarily opened in response to the functioning of said breech block slide each time the gun is fired; selectively operable means coupled to the actuating means of the normally closed charging valve for opening said charging valve independently of the operation of the gun firing control to supply fluid pressure to the control piston from the fluid pressure source, whereby fluid pressure from said source is admitted into the cylinder of the gun charger for moving the piston in said cylinder from the first position to the second position; and a normally closed firing valve adapted to prevent the relief valve from releasing fluid pressure supplied to the control piston when the charging valve is opened by the selectively operable means, said normally closed firing valve being connectable to the firing control of the gun for operation by said firing control, whereby the actuation of said gun firing control automatically opens the normally closed firing valve to permit the relief valve to release fluid pressure supplied to the control piston by the second means while the gun is firing.

References Cited in the file of this patent

UNITED STATES PATENTS

| 1,596,145 | Black | Aug. 17, 1926 |
| 2,071,020 | Boussel | Feb. 16, 1937 |
| 2,379,180 | Pohl | June 26, 1945 |
| 2,423,446 | Grant | July 8, 1947 |
| 2,575,368 | Thomsen | Nov. 20, 1951 |
| 2,590,153 | Bunnell | Mar. 25, 1952 |

FOREIGN PATENTS

| 14,271 | Great Britain | of 1887 |